United States Patent [19]

Nishimura et al.

[11] 4,336,154
[45] Jun. 22, 1982

[54] PHOSPHOR AND RADIATION IMAGE STORAGE PANEL UTILIZING THE SAME

[75] Inventors: Yoshitugu Nishimura; Noboru Kotera, both of Odawara, Japan

[73] Assignee: Kasei Optonix, Ltd., Tokyo, Japan

[21] Appl. No.: 283,207

[22] Filed: Jul. 14, 1981

[51] Int. Cl.$^3$ ............................................. C09K 11/465
[52] U.S. Cl. .......................... 252/301.4 H; 250/327.1; 250/484; 252/301.6 R
[58] Field of Search .................. 252/301.4 H, 301.6 R; 250/484, 327.1

[56] References Cited

U.S. PATENT DOCUMENTS

| | | | |
|---|---|---|---|
| 3,431,216 | 3/1969 | Chenot | 252/301.4 H |
| 3,951,848 | 4/1976 | Wolfe et al. | 252/301.4 H |
| 4,057,508 | 11/1977 | Wolfe et al. | 252/301.4 H |
| 4,138,529 | 2/1979 | Mori et al. | 252/301.4 H X |

FOREIGN PATENT DOCUMENTS

| | | | |
|---|---|---|---|
| 2928245 | 1/1980 | Fed. Rep. of Germany | 252/301.4 H |
| 55-48280 | 4/1980 | Japan | 252/301.4 H |

*Primary Examiner*—Jack Cooper
*Attorney, Agent, or Firm*—Gerald J. Ferguson, Jr.; Joseph J. Baker

[57] ABSTRACT

A divalent metal fluorohalide phosphor having a compositional formula:

$$(Ba_{1-x}, M^{II}_x)F_2 \cdot aBaX_2 \cdot yEu, zB$$

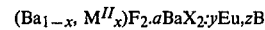

(wherein, $M^{II}$ is at least one member selected from the group consisting of beryllium, magnesium, calcium, strontium, zinc, and cadmium, X is at least one member selected from the group consisting of chlorine, bromine, and iodine, and a, x, y, and z are numbers satisfying the respective conditions $0.5 \leq a \leq 1.25$, $0 \leq x \leq 1$, $10^{-6} \leq y \leq 2 \times 10^{-1}$, and $0 < z \leq 2 \times 10^{-1}$), when exposed to and allowed to absorb radiation or ionizing radiation and subsequently excited with a light of 450 to 800 nm of wave length, provides stimulated emission of light with heretofore unattainable high luminance.

A radiation image storage panel is produced by depositing on a support a phosphor layer formed of the phosphor of this invention.

6 Claims, 2 Drawing Figures

PHOSPHOR AND RADIATION IMAGE STORAGE PANEL UTILIZING THE SAME

BACKGROUND OF THE INVENTION

1. Field of the Invention

This invention relates to a divalent metal fluorohalide phosphor and to a radiation image storage panel incorporating a phosphorescent layer formed of the phosphor.

2. Description of the Prior Art

Heretofore, the so-called photographic method which uses a photographic film incorporating an emulsion layer of a silver salt sensitive material has been employed to produce a picture of a radiation image. Recently, because of problems such as of exhaustion of silver resources, a method for producing a picture of a radiation image without having to use any silver salt has been in demand.

Incidentally, some phosphors have a property such that when they are made to absorb a radiation such as ionizing radiation, electron rays, vacuum ultraviolet rays, or ultraviolet rays and thereafter are excited with visible rays or electromagnetic waves which are infrared rays, they emit light. This phenomenon is called "stimulation" and the phosphors which exhibit such stimulation are called "stimulable phosphors." Among the methods known to effect radiation image storage without using any silver salt is included a method which provides the radiation image storage by use of such a stimulable phosphor (U.S. Pat. No. 3,859,527). This method utilizes a radiation image storage panel incorporating a phosphor layer formed of a stimulable phosphor (popularly known as storage type radiation image storage panel). The method comprises causing the phosphor layer of the panel to absorb a radiation passed through an object being photographed, then exciting the phosphor layer with visible rays or infrared rays thereby causing radiation energy stored in the stimulable phosphor to be released in the form of phosphorescent light, and detecting the emitted light thereby obtaining a radiation image of the object. This method of radiation image storage is actually worked more often than not by using an ionizing radiation such as X-rays as the radiation source and a human as the object to be photographed. In this connection, the amount of the radiation to which the object is exposed is required to be decreased as much as possible. From this point of view, the stimulable phosphor used in the radiation image storage panel is desired to possess the highest possible stimulation luminance.

A europium activated divalent metal fluorohalide phosphor represented by the compositional structure:

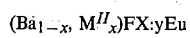

(wherein, $M^{II}$ is at least one member selected from the group consisting of beryllium, magnesium, calcium, strontium, zinc, and cadmium, X is at least one member selected from the group consisting of chlorine, bromine, and iodine, and a, x, and y are numbers satisfying the respective conditions $0.5 \leq a \leq 1.25$, $0 \leq x \leq 1$, and $10^{-6} \leq y \leq 2 \times 10^{-1}$) is a practical stimulable phosphor. When this phosphor is irradiated with a radiation and allowed to absorb the radiation and subsequently excited with a light of 450 to 800 nm, it provides stimulated emission of light with high luminance. This europium activated divalent metal fluorohalide phosphor has been partially known in the art. Japanese Unexamined Patent Publication No. 55(1980)-12143 and Japanese Unexamined Patent Publication No. 55(1980)-12145 disclose a divalent metal fluorohalide stimulable phosphor represented by a compositional formula:

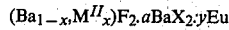

(wherein, $M^{II}$ is at least one member selected from the group consisting of magnesium, calcium, strontium, zinc and cadmium, X is at least one member selected from the group consisting of chlorine, bromine, and iodine, and x and y are numbers satisfying the respective conditions $0 \leq x \leq 0.6$ and $0 \leq y \leq 2 \times 10^{-1}$). As described above, when a stimulable phosphor is used in a radiation image storage panel, it is desired to provide stimulated emission of light with high luminance. By this reason, a stimulable phosphor capable of providing stimulated emission of light with a higher luminance than the aforementioned europium activated divalent metal fluorohalide phosphor is in demand.

SUMMARY OF THE INVENTION

An object of this invention, therefore, is to provide a phosphor which provides stimulated emission of light with higher luminance than the conventional europium activated divalent metal fluorohalide phosphor mentioned above.

Another object of this invention is to provide a radiation image storage panel having higher sensitivity than the radiation image storage panel incorporating a phosphor layer formed of the conventional europium activated divalent metal fluorohalide phosphor.

With a view to attaining the objects described above, the inventors performed various experiments on coactivating agents for europium, the activating agent for the aforementioned phosphor. They have, consequently, found that the luminance with which the aforementioned phosphor provides stimulated emission of light is notably enhanced by allowing the phosphor to contain a suitable amount of boron as a coactivating agent for europium. This invention has issued from this knowledge.

The divalent metal fluorohalide phosphor of the present invention is represented by a compositional formula:

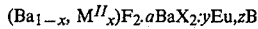

(wherein, $M^{II}$ is at least one member selected from the group consisting of beryllium, magnesium, calcium, strontium, zinc, and cadmium, X is at least one member selected from the group consisting of chlorine, bromine, and iodine, and a, x, y, and z are numbers satisfying the respective conditions $0.5 \leq a \leq 1.25$, $0 \leq x \leq 1$, $10^{-6} \leq y \leq 2 \times 10^{-1}$, and $0 < z \leq 2 \times 10^{-1}$).

The radiation image storage panel of the present invention is a radiation image storage panel incorporating a phosphor layer formed of a stimulable phosphor, which is characterized by the stimulable phosphor comprising the divalent metal fluorohalide phosphor of the present invention.

The phosphor of this invention, when exposed to and allowed to absorb an ionizing radiation such as X-rays or γ rays or a radiation such as electron rays, vacuum ultraviolet rays or ultraviolet rays and subsequently excited with a light having 450 to 800 nm of wavelength, provides stimulated emission of light with notably higher luminance than the conventional europium activated divalent metal fluorohalide phosphor. Consequently, the radiation image storage panel of this invention incorporating a phosphor layer formed of the phosphor of this invention is far more sensitive than the radiation image storage panel incorporating a phosphor layer formed of the conventional europium activated divalent fluorohalide phosphor. From the standpoint of the luminance of the light of stimulated emission, the preferred ranges for the values of y and z in the aforementioned compositional formula of the phosphor of this invention are respectively $10^{-5} \leq y \leq 10^{-2}$ and $3 \times 10^{-4} \leq z \leq 10^{-1}$. Even by the excitation with ionizing radiation or radiation such as electron rays, vacuum ultraviolet rays, or ultraviolet rays, the phosphor of this invention provides emission (instanteneous emission) of a near-ultraviolet to blue color with high luminance. When the phosphor of this invention is exposed to and allowed to absorb ionizing radiation or radiation such as electron rays, vacuum ultraviolet rays, or ultraviolet rays and subsequently exposed to heat, it exhibits thermophosphorescence.

DETAILED DESCRIPTION OF THE INVENTION

Figure 1:
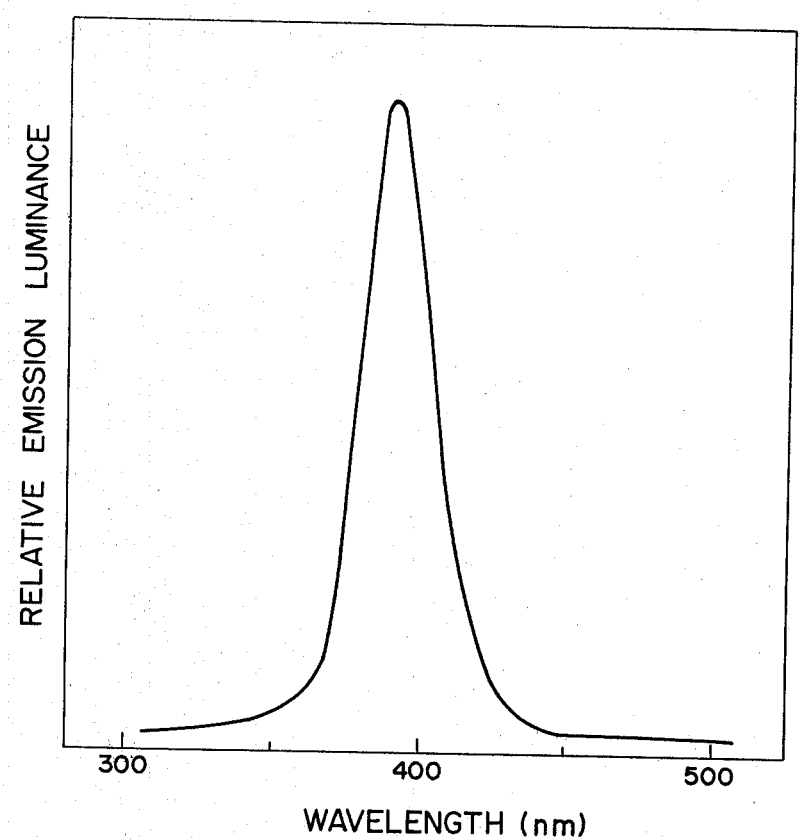
FIG. 1 is a graph illustrating a spectrum of the light of stimulated emission of the phosphor of the present invention.

The phosphor of this invention is prepared by the method described below.

First, as the raw materials:

(i) Barium fluoride ($BaF_2$), (ii) At least one divalent metal fluoride selected from the group consisting of beryllium fluoride ($BeF_2$), magnesium fluoride ($MgF_2$), calcium fluoride ($CaF_2$), strontium fluoride ($SrF_2$), zinc fluoride ($ZnF_2$), and cadmium fluoride ($CdF_2$), (iii) At least one halogenide selected from the group consisting of barium chloride ($BaCl_2$), barium bromide ($BaBr_2$), barium iodide ($BaI_2$), ammonium chloride ($NH_4Cl$), ammonium bromide ($NH_4Br$), and ammonium iodide ($NH_4I$), (iv) At least one member selected from the group of europium compounds such as, for example, europium chloride ($EuCl_3$), europium oxide ($Eu_2O_3$), europium fluoride ($EuF_3$), and europium sulfate [$Eu_2(SO_4)_3$], and (v) At least one member selected from the group of boron compounds such as, for example, boric anhydride ($B_2O_3$), boric acid ($H_3BO_3$), and ethyl borate ($C_6H_{15}BO_3$)

are used. The raw materials for the phosphor mentioned above are weighed out in stoichiometric amounts such that their mixture gives rise to a compositional formula:

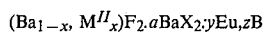

$$(Ba_{1-x}, M^{II}_x)F_2 \cdot aBaX_2 : yEu, zB$$

(wherein, $M^{II}$ is at least one member selected from the group consisting of beryllium, magnesium, calcium, strontium, zinc, and cadmium, X is at least one member selected from the group consisting of chlorine, bromine, and iodine, and a, x, y, and z are numbers satisfying the respective conditions $0.5 \leq a \leq 1.25$, $0 \leq x \leq 1$, $10^{-6} \leq y \leq 2 \times 10^{-1}$, and $0 \leq z \leq 2 \times 10^{-1}$) and they are thoroughly mixed by use of a ball mill or a mixer mill, for example. When the value of x in the aforementioned compositional formula is O, the aforementioned raw material (ii) for the phosphor is not required. When the value of x is 1, the aforementioned raw material (i) for the phosphor is not required and, as the aforementioned raw material (iii) for the phosphor, at least a barium halogenide must be used without fail. If an ammonium halogenide ($NH_4X$) is used as one of the raw materials for the phosphor, there may be times when the halogen (X) will be present in excess of the aforementioned stoichiometric amount in the mixture of raw materials. This excess halogen (X) is expelled in the form of $NH_4X$ from the reaction system in the stage of burning which is described more fully afterward.

Then, the aforementioned mixture of raw materials is placed in a refractory vessel such as an alumina crucible or quartz crucible and is subjected to burning within an electric furnace. The burning temperature suitably ranges from 600° to 1000° C., preferably from 700° to 950° C. Although the burning time is variable with the amount of the mixture of raw materials placed in the vessel, the burning temperature adopted, and the like, it ranges suitably from 1 to 6 hours. Although the burning may be carried out in the air, it is desired to be carried out in a neutral atmosphere such as an atmosphere of argon gas or an atmosphere of nitrogen gas or in a weakly reducing atmosphere such as an atmosphere of carbon or an atmosphere of nitrogen gas containing a small amount of hydrogen gas. When the product of the burning performed under the conditions described above is removed from the electric furnace, pulverized, and subsequently burnt again under the same conditions, the phosphor thus produced provides the stimulated emission of light with further improved luminance. The product of the burning is subjected to the steps of pulverizing, washing, drying, sifting, etc. which are normally adopted in the production of any phosphor. Consequently, the phosphor aimed at by this invention is obtained.

The divalent metal fluorohalide phosphor of this invention prepared as described above provides stimulated emission of light with higher luminance and exhibits instantaneous emission of light and thermophosphorescence both at higher luminance than the conventional europium activated divalent metal fluorohalide phosphor.

FIG. 1 illustrates a spectrum of stimulated emission produced when the $BaF_2 \cdot BaBr_2 : 0.0005Eu, 0.01B$ phosphor of this invention irradiated in advance with X-rays of 80 KVp was excited with a light of 630 nm. As is clear from FIG. 1, the divalent metal fluorohalide phosphor of this invention exhibits stimulated emission of light of a near-ultraviolet to blue color having an emission spectral peak in the neighborhood of 390 nm similarly to the conventional divalent metal fluorohalide phosphor using europium exclusively as an activating agent. The emission spectrum of an instantaneous emission of light produced when the phosphor of the present invention was excited by radiation such as X-rays, electron rays, or ultraviolet rays was substantially the same as the emission spectrum of the light of stimulated emission illustrated in FIG. 1. When the composition of the phosphor of this invention varies within the range of the aforementioned compositional formula, substantially no change occurs in the emission spectrum. The phosphors of varying compositions falling within this range invariably exhibit stimulated emission of light of a near-ultraviolet to blue color and instantaneous emission of light both having emission spectral peaks in the neighborhood of 390 nm.

Figure 2:
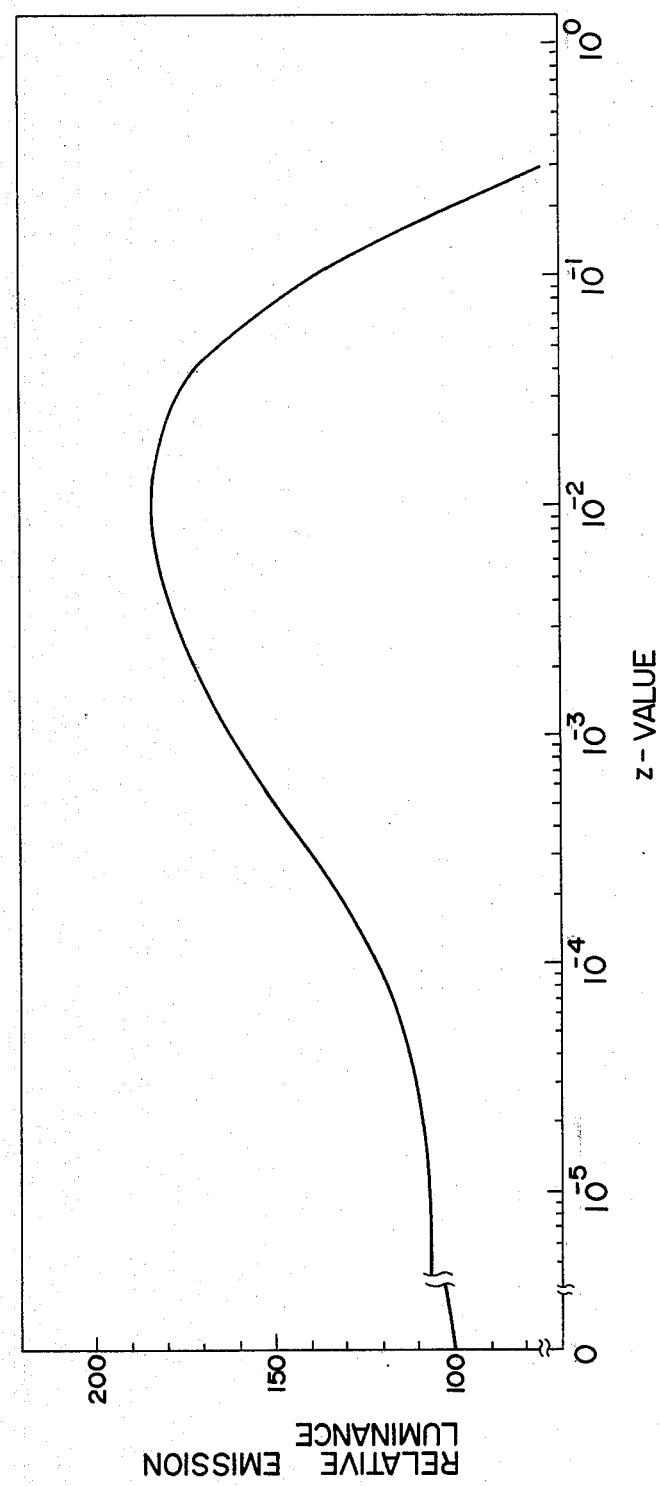
FIG. 2 is a graph showing the relation between the amount of a coactivating agent (value of z) in the phosphor of this invention and the luminance of the light of stimulated emission of the phosphor.

FIG. 2 is a graph showing the relation between the amount of boron (value of z) in a phosphor of a composition $BaF_2.BaBr_2:0.0005Eu,zB$ conforming to the compositional formula of the present invention and the luminance of emission produced when this phosphor irradiated in advance with X-rays of 80 KVp was stimulated by excitation with a light of 630 nm. In FIG. 2, the vertical axis which is the scale for the luminance of the light of stimulated emission is graduated by the relative value based on the luminance of the light of stimulated emission of the conventional $BaF_2.BaBr_2:0.0005Eu$ phosphor having boron not coactivated taken as 100. It is clear from FIG. 2 that for the fixed amount of activation by europium (value of y), the $BaF_2.BaBr_2:0.0005Eu,zB$ phosphor exhibits higher luminance of stimulated emission than the conventional $BaF_2.BaBr_2:0.0005Eu$ phosphor when the value of z falls in the range of $0 < z \leq 2 \times 10^{-1}$ and still higher luminance of stimulated emission when the value of z falls in the range of $3 \times 10^{-4} \leq z \leq 10^{-1}$. FIG. 2 is a graph showing the relation between the value of z and the luminance of the light of stimulated emission obtained of the $BaF_2.BaBr_2:0.0005Eu, zB$ phosphor. It has been confirmed that even when the value of y is varied, the relation between the value of z and the luminance of the light of stimulated emission has substantially the same trend as indicated in FIG. 2. It has been also conformed that even when the backbone composition is varied within the aforementioned range of the compositional formula, the relation between the value of z and the luminance of the light of stimulated emission has substantially the same trend as indicated in FIG. 2.

The range of the amount of activation by europium (value of y) in the divalent metal fluorohalide phosphor of this invention is the same as that of the conventional divalent metal fluorohalide phosphor using europium as a sole activating agent, which is $10^{-6} \leq y \leq 2 \times 10^{-1}$. The range of the value of y which proves desirable from the standpoint of the luminance of the light of stimulated emission is $10^{-5} \leq y \leq 10^{-2}$. The range of the amount of $M^{II}$ (value of x) and the range of the amount of $BaX_2$ (value of a) in the divalent metal fluorohalide phosphor of this invention is fixed, from the standpoint of the luminance of the light of stimulated emission, respectively to $0 \leq x \leq 1$ and $0.5 \leq a \leq 1.25$ similarly to the conventional divalent metal fluorohalide phosphor.

The excitation spectrum of the stimulation of the divalent metal fluorohalide phosphor of this invention is substantially the same as that of the conventional divalent metal fluorohalide phosphor incorporating europium as a sole activating agent. The phosphor of this invention exhibits stimulated emission of light when it is excited with a light having a wavelength of from 450 to 800 nm. The luminance of the light of stimulated emission is particularly high when the wavelength of the light used for the excitation falls within the portion of 450 to 700 nm of the range mentioned above.

Now, the radiation image storage panel of the present invention will be described.

The radiation image storage panel of this invention incorporates a phosphor layer formed of the aforementioned divalent metal fluorohalide phosphor. Generally, the phosphor layer is formed by having the phosphor dispersed in a suitable binder. If the phosphor layer possesses a selfsupporting property, then the phosphor layer itself can constitute a radiation image storage panel. Generally, the radiation image storage panel is formed by having the phosphor layer deposited on either or both of the opposite surfaces of a sheet-like support. Ordinarily, the surface of the phosphor layer (the surface opposite that of the support for the phosphor layer) is coated with a protective film serving to protect the phosphor layer physically and chemically. For the purpose of heightening the fastness of adhesion between the phosphor layer and the support, a layer of undercoat may be interposed between the phosphor layer and the support.

Generally, the radiation image storage panel of the present invention is produced as follows. First, a phosphor coating liquid is prepared by mixing 1 part by weight of a divalent metal fluorohalide phosphor of this invention with 0.01 to 1 part by weight of a binder. This liquid is applied by a suitable method to the upper surface of a support set horizontally and then allowed to dry. Consequently, a phosphor layer is formed on the support and a radiation image storage panel is completed. As the binder, there can be used any of the binders such as nitrocellulose, vinyl chloride-vinyl acetate copolymer, polyvinyl butyral, polyvinyl acetate, and polyurethan which are adopted ordinarily for the formation of layers. As the support, there can be used any of the sheetlike materials such plastic sheet, glass sheet, paper, and metal sheet. For the convenience of handling, the support is desired to possess flexibility and excel in fabricability. Examples of desirable supports, therefore, are plastic sheets including polyester film, polyethylene terephthalate film, and cellulose acetate film and paper. The thickness of the phosphor layer is suitably selected within the range of from 10 to $1000\mu$. The protective film for the phosphor layer in the radiation image storage panel is formed by directly applying to the upper surface of the phosphor layer obtained as described above a coating liquid prepared by dissolving in a suitable solvent the resin of polyvinyl chloride, polyethylene terephthalate, polymethacrylate, or cellulose acetate and allowing the applied film of the liquid to dry or by applying to the surface of the phosphor layer a transparent film formed separately of such a resin in advance. The formation of the phosphor layer on the support can be effected by directly coating to the support a coating liquid obtained by dispersing a stimulable phosphor in a binder in the same way as described above or by applying to the support a phosphor layer separately formed in advance.

As described above, the phosphor of the present invention, when exposed to and allowed to absorb ionizing radiation or radiation such as electron rays, vacuum ultraviolet rays, or ultraviolet rays and subsequently excited with a light of 450 to 800 nm, provides stimulated emission of light with higher luminance then the conventional divalent fluorohalide phosphor using europium as a sole activating agent. The radiation image storage panel of this invention incorporating a phosphor layer formed of the phosphor of this invention, therefore, is more sensitive than the radiation image storage panel incorporating a phosphor layer formed of the conventional divalent metal fluorohalide phosphor using europium as a sole activating agent. Thus, the phosphor of this invention is particularly useful for the radiation image storage panel. This does not necessarily means that the radiation image storage panel is the only use found for the phosphor of this invention. For example, since the phosphor of this invention provides instantaneous emission of light of near-ultraviolet to blue color with high luminance when it is excited with ionizing radiation or radiation such as electron rays, vacuum ultraviolet rays, or ultraviolet rays, it can be utilized in sensitized paper, cathode-ray tube, fluorescent bulb, etc. Further since the phosphor of this invention, when exposed to and allowed to absorb ionizing radiation or radiation such as electron rays, vacuum ultraviolet rays, or ultraviolet rays and subsequently exposed to heat, exhibits thermophosphorescence with high luminance, it can be utilized as in a thermophosphorescence dosimeter, for example. Thus, the present invention possesses very high economic utility.

Now, the present invention will be described below with reference to working examples.

The various raw materials for phosphors enumerated in (1) through (12) below are weighed out as indicated and were thoroughly mixed in a ball mill, to prepare 12 mixtures of raw materials for phosphors.

(1) $BaF_2$ 175.3 g (1 mol), $BaBr_2.2H_2O$ 333.2 g (1 mol), $EuCl_3$ 0.13 g (0.0005 mol), and $B_2O_3$ 0.35 g (0.005 mol)

(2) $BaF_2$ 166.5 g (0.95 mol), $BeF_2$ 1.4 g (0.05 mol), $BaBr_2.2H_2O$ 333.2 g (1 mol), $EuCl_3$ 0.13 g (0.0005 mol), and $B_2O_3$ 0.35 g (0.005 mol)

(3) $BaF_2$ 166.5 g (0.95 mol), $MgF_2$ 3.1 g (0.05 mol), $BaBr_2.2H_2O$ 333.2 g (1 mol), $EuCl_3$ 0.104 g (0.0004 mol), and $B_2O_3$ 0.35 g (0.005 mol)

(4) $BaF_2$ 166.5 g (0.95 mol), $CaF_2$ 3.9 g (0.05 mol), $BaBr_2.2H_2O$ 333.2 g (1 mol), $EuCl_3$ 0.104 g (0.0004 mol), and $B_2O_3$ 0.35 g (0.005 mol)

(5) $BaF_2$ 166.5 g (0.95 mol), $SrF_2$ 6.3 g (0.05 mol), $BaBr_2.2H_2O$ 333.2 g (1 mol), $EuCl_3$ 0.077 g (0.0003 mol), and $B_2O_3$ 0.35 g (0.005 mol)

(6) $BaF_2$ 166.5 g (0.95 mol), $ZnF_2$ 5.2 g (0.05 mol), $BaBr_2.2H_2O$ 333.2 g (1 mol), $EuCl_3$ 0.077 g (0.0003 mol), and $B_2O_3$ 0.35 g (0.005 mol)

(7) $BaF_2$ 170.0 g (0.97 mol), $CdF_2$ 4.5 g (0.03 mol), $BaBr_2.2H_2O$ 333.2 g (1 mol), $EuCl_3$ 0.104 g (0.0004 mol), and $B_2O_3$ 0.35 g (0.005 mol)

(8) $BaF_2$ 175.3 g (1 mol), $BaCl_2.2H_2O$ 244.2 g (1 mol), $EuCl_3$ 0.13 g (0.0005 mol), and $H_3BO_3$ 0.62 g (0.01 mol)

(9) $BaF_2$ 175.3 g (1 mol), $BaI_2.2H_2O$ 428.0 g (1 mol), $EuF_3$ 0.084 g (0.0004 mol), and $H_3BO_3$ 0.62 g (0.01 mol)

(10) $BaF_2$ 175.3 g (1 mol), $BaBr_2.2H_2O$ 320.0 g (0.96 mol), $BaCl_2.2H_2O$ 12.2 g (0.05 mol), $EuF_3$ 0.084 g (0.0004 mol), and $H_3BO_3$ 0.62 g (0.01 mol)

(11) $BaF_2$ 175.3 g (1 mol), $BaBr_2.2H_2O$ 326.5 g (0.98 mol), $BaI_2.2H_2O$ 17.1 g (0.04 mol), $EuCl_3$ 0.13 g (0.0005 mol), and $B_2O_3$ 0.28 g (0.004 mol)

(12) $BaF_2$ 166.5 g (0.95 mol), $MgF_2$ 3.1 g (0.05 mol), $BaBr_2.2H_2O$ 303.2 g (0.91 mol), $BaCl_2.2H_2O$ 24.4 g (0.1 mol), $EuCl_3$ 0.13 g (0.0005 mol), and $H_3BO_3$ 0.62 g (0.01 mol)

The 12 mixtures of raw materials for phosphors described above were placed each in an alumina crucible and set in an electric furnace. The mixtures of (9) and (11) were heated at 800° C. in an atmosphere of nitrogen gas containing 2% of hydrogen gas and the other mixtures were heated at 850° C. in an atmosphere of carbon, invariably for three hours. After the burning, the crucibles were removed from the electric furnace and cooled suddenly in the air. The products of the burning were pulverized and sifted to a uniform particle diameter, to afford phosphors. The 12 phosphors thus produced were exposed to X-rays of 80 KVp and then excited with a light of 630 nm obtained by separating the light emitted from a xenone lamp set on a spectroscope (spectrophotometer, Model MPF-2A, made by Hitachi Ltd.), with the respective lights of stimulated emission measured for luminance. Consequently, the luminances of the lights of stimulated emission from these stimulable phosphors, as shown in the following table, were notably higher than those measured under the identical conditions of the conventional europium activated divalent metal fluorohalide phosphors prepared by the identical method, except that use of coactivating agents was omitted.

| Phosphor No. | Compositional formula of phosphor | Luminance of light of stimulated emission* |
|---|---|---|
| Conventional phosphor | $BaF_2 . BaBr_2:0.0005Eu$ | 100 |
| This invention (1) | $BaF_2 . BaBr_2:0.0005Eu,0.01B$ | 185 |
| Conventional phosphor | $(Ba_{0.95},Be_{0.05})F_2 . BaBr_2:0.0005Eu$ | 100 |
| This invention (2) | $(Ba_{0.95},Be_{0.05})F_2 . BaBr_2:0.0005Eu,0.01B$ | 150 |
| Conventional phosphor | $(Ba_{0.95},Mg_{0.05})F_2 . BaBr_20.0004Eu$ | 100 |
| This invention (3) | $(Ba_{0.95},Mg_{0.05})F_2 . BaBr_2:0.0004Eu,0.01B$ | 120 |
| Conventional phosphor | $(Ba_{0.95},Ca_{0.05})F_2 . BaBr_2:0.0004Eu$ | 100 |
| This invention (4) | $(Ba_{0.95},Ca_{0.05})F_2 . BaBr_2:0.0004Eu,0.01B$ | 130 |
| Conventional phosphor | $(Ba_{0.95},Sr_{0.05})F_2 . BaBr_2:0.0003Eu$ | 100 |
| This invention (5) | $(Ba_{0.95},Sr_{0.05})F_2 . BaBr_2:0.0003Eu,0.01B$ | 110 |
| Conventional phosphor | $(Ba_{0.95},Zn_{0.05})F_2 . BaBr_2:0.0003Eu$ | 100 |
| This invention (6) | $(Ba_{0.95},Zn_{0.05})F_2 . BaBr_2:0.0003Eu,0.01B$ | 155 |
| Conventional phosphor | $(Ba_{0.97},Cd_{0.03})F_2 . BaBr_2:0.0004Eu$ | 100 |
| This invention (7) | $(Ba_{0.97}, Cd_{0.03})F_2 . BaBr_2:0.0004Eu,0.01B$ | 120 |
| Conventional phosphor | $BaF_2 . BaCl_2:0.0005Eu$ | 100 |
| This invention (8) | $BaF_2 . BaCl_2:0.0005Eu,0.01B$ | 170 |
| Conventional phosphor | $BaF_2 . BaI_2:0.0004Eu$ | 100 |
| This invention (9) | $BaF_2 . BaI_2:0.0004Eu,0.01B$ | 150 |
| Conventional phosphor | $BaF_2 . 1.01Ba(Br_{0.95},Cl_{0.05})_2:0.0004Eu$ | 100 |
| This invention (10) | $BaF_2 . 1.01Ba(Br_{0.95},Cl_{0.05})_2:0.0004Eu,0.02B$ | 120 |
| Conventional phosphor | $BaF_2 . 1.02Ba(Br_{0.96},I_{0.04})_2:0.0005Eu$ | 100 |
| This invention (11) | $BaF_2 . 1.02Ba(Br_{0.96},I_{0.04})_2:0.0005Eu,0.008B$ | 130 |
| Conventional phosphor | $(Ba_{0.95},Mg_{0.05})F_2 . 1.01Ba(Br_{0.9},Cl_{0.1})_2:0.0005Eu$ | 100 |

| Phosphor No. | Compositional formula of phosphor | Luminance of light of stimulated emission* |
|---|---|---|
| This invention (12) | $(Ba_{0.95},Mg_{0.05})F_2 \cdot 1.01Ba(Br_{0.9},Cl_{0.1})_2 : 0.0005Eu, 0.001B$ | 115 |

*The luminance of light of stimulated emission is expressed by relative value based on the luminance of the conventional phosphor, taken as 100.

Then, a phosphor coating liquid having a viscosity of about 50 cs was prepared by mixing 8 parts by weight of each of the 18 phosphors of the present invention mentioned above and 1 part by weight of nitrocellulose in a solvent (a mixture of acetone, ethyl acetate, and butyl acetate). Then, this coating liquid was uniformly applied with a knife coater to the upper surface of a polyethylene terephthalate film (support) set horizontally and the applied film of the liquid was dried at 50° C. to form a phosphor layer having a thickness of about 300μ. Subsequently, an acetone solution of cellulose acetate was uniformly spread on the phosphor layer and the applied film of the solution was dried to form a transparent protective film having a thickness of about 8μ. Thus, 18 radiation image storage panels were produced. For the purpose of comparison, radiation image storage panels were prepared by the same procedure by using the conventional europium activated divalent metal fluorohalide phosphors.

Similarly to the luminances of the lights of stimulated emission indicated in the foregoing table, the sensitivities of the radiation image storage panels of this invention produced as described above [i.e., the luminances of the lights of stimulated emission produced when the respective radiation image storage panels exposed in advance with X-rays of 80 KVp of tube voltage were excited with a He-Ne laser beam (633 nm)] were invariably higher than those of the radiation image storage panels incorporating phosphor layers formed of the conventional europium activated divalent metal fluorohalide phosphors. prepared for comparison.

We claim:

1. A divalent metal fluorohalide phosphor represented by the compositional formula:

$(Ba_{1-x}M^{II}_x)F_2 \cdot aBaX_2 \cdot yEu, zB$ wherein, $M^{II}$ is at least one member selected from the group consisting of beryllium, magnesium, calcium, strontium, zinc, and cadmium, X is at least one member selected from the group consisting of chlorine, bromine, and iodine, and a, x, y, and z are numbers satisfying the respective conditions $0.5 \leq a \leq 1.25$, $0 \leq x \leq 1$, $10^{-6} \leq y \leq 2 \times 10^{-1}$, and $0 < z \leq 2 \times 10^{-1}$ and exhibiting a higher luminance than said phosphor absent B when it is exposed to and allowed to absorb radiation and is subsequently excited with light having a wavelength of 450 to 800 nm.

2. The divalent metal fluorohalide phosphor according to claim 1, wherein said y is a number satisfying the condition $10^{-5} \leq y \leq 10^{-2}$.

3. The divalent metal fluorohalide phosphor according to claim 1 or claim 2, wherein said z is a number satisfying the condition $3 \times 10^{-4} \leq z \leq 10^{-1}$.

4. A radiation image storage panel comprising a phosphor layer formed of a stimulable divalent metal fluorohalide phosphor represented by the compositional formula:

$(Ba_{1-x}M^{II}_x)F_2 \cdot aBaX_2 \cdot yEu, zB$ wherein, $M^{II}$ is at least one member selected from the group consisting of beryllium, magnesium, calcium, strontium, zinc, and cadmium, X is at least one member selected from the group consisting of chlorine, bromine, and iodine, and a, x, y, and z are numbers satisfying the respective conditions $0.5 \leq a \leq 1.25$, $0 \leq x \leq 1$, $10^{-6} \leq y \leq 2 \times 10^{-1}$, and $0 \leq z \leq 2 \times 10^{-1}$ and exhibiting a higher luminance than said phosphor absent B when it is exposed to and allowed to absorb radiation and is subsequently excited with light having a wavelength of 450 to 800 nm.

5. The radiation image storage panel according to claim 4, wherein said y is a number satisfying the condition $10^{-5} \leq y \leq 10^{-2}$.

6. The radiation image storage panel according to claim 4 or claim 5, wherein said z is a number satisfying the condition $3 \times 10^{-4} \leq z \leq 10^{-1}$.

* * * * *